(12) United States Patent
Nadgouda et al.

(10) Patent No.: US 8,241,165 B2
(45) Date of Patent: Aug. 14, 2012

(54) SEAT LIFTING ASSEMBLY

(75) Inventors: Prasad Nadgouda, Maharashtra (IN);
Vikram Nanagiri, Maharashtra (IN);
Ashok Ramteke, Maharashtra (IN)

(73) Assignee: Hema Engineering Industries Limited, Pune (IN)

( * ) Notice: Subject to any disclaimer, the term of this patent is extended or adjusted under 35 U.S.C. 154(b) by 234 days.

(21) Appl. No.: 12/652,890

(22) Filed: Jan. 6, 2010

(65) Prior Publication Data

US 2010/0289314 A1   Nov. 18, 2010

(30) Foreign Application Priority Data

May 13, 2009  (IN) .......................... 1238/MUM/2009

(51) Int. Cl.
*F16H 1/32* (2006.01)

(52) U.S. Cl. ...................................... 475/177

(58) Field of Classification Search .................. 475/176, 475/177
See application file for complete search history.

(56) References Cited

U.S. PATENT DOCUMENTS

| | | | | |
|---|---|---|---|---|
| 5,308,294 | A * | 5/1994 | Wittig et al. | 475/162 |
| 6,422,651 | B1 * | 7/2002 | Muhlberger et al. | 297/344.12 |
| 6,578,921 | B2 * | 6/2003 | Koga et al. | 297/362 |
| 7,235,030 | B2 * | 6/2007 | Becker et al. | 475/177 |

* cited by examiner

*Primary Examiner* — Edwin A Young
(74) *Attorney, Agent, or Firm* — Ladas & Parry LLP

(57) ABSTRACT

The problem to be solved is to provide a seat lifting assembly where lesser angular movement of the lifting means provide larger increase or decrease in the height of the seat and the problem is solved by providing a seat lifting assembly having a lifting means, an assembly of gears, arrangement of shafts and link which provides higher movement to seat with respect to smaller angular movement of lifting means.

10 Claims, 13 Drawing Sheets

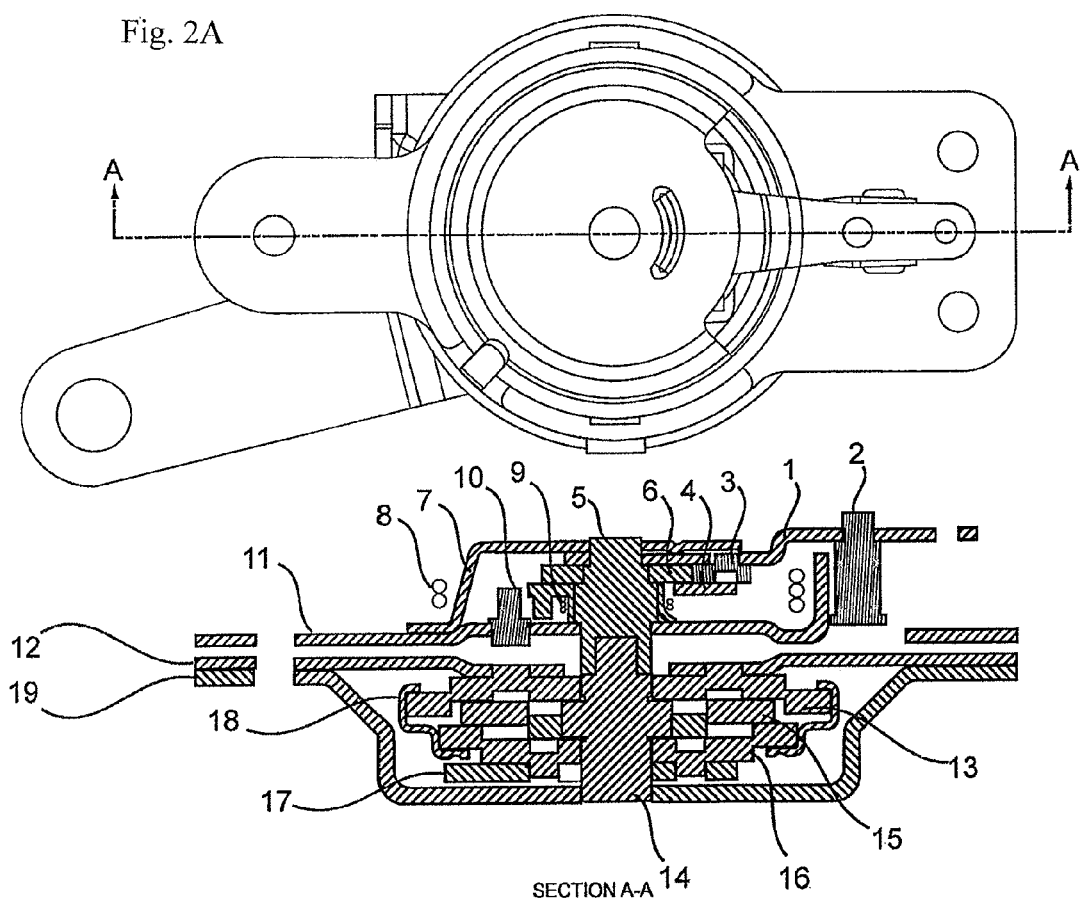

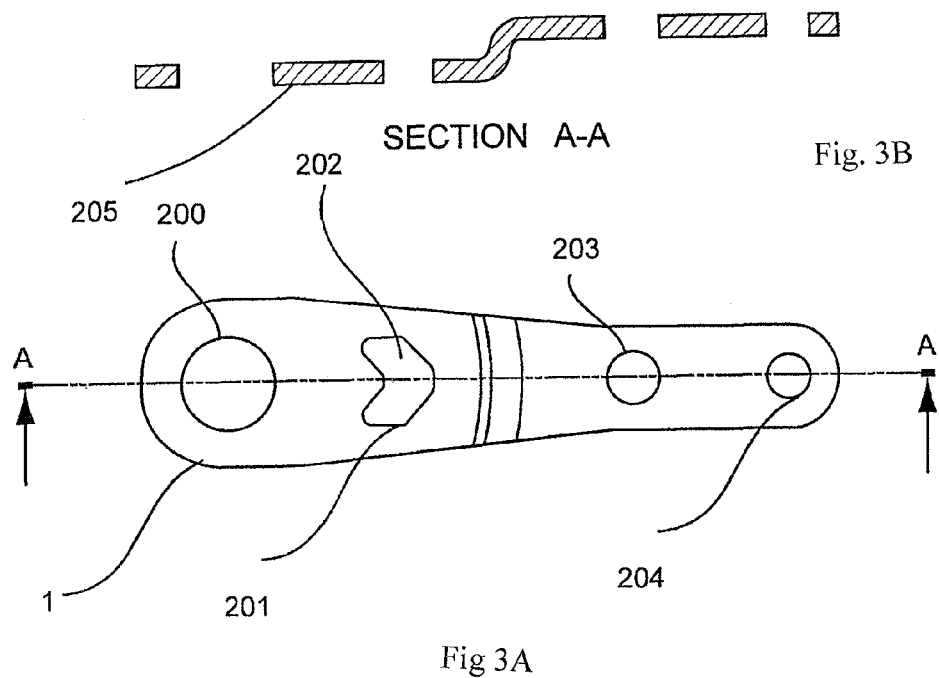
Fig. 3B
Fig 3A
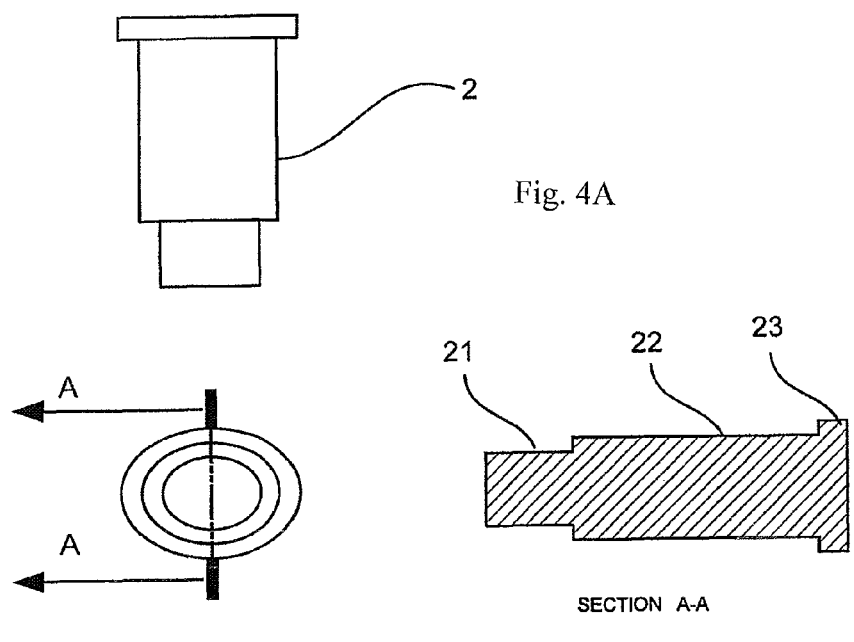
Fig. 4A
Fig. 4B
Fig. 4C

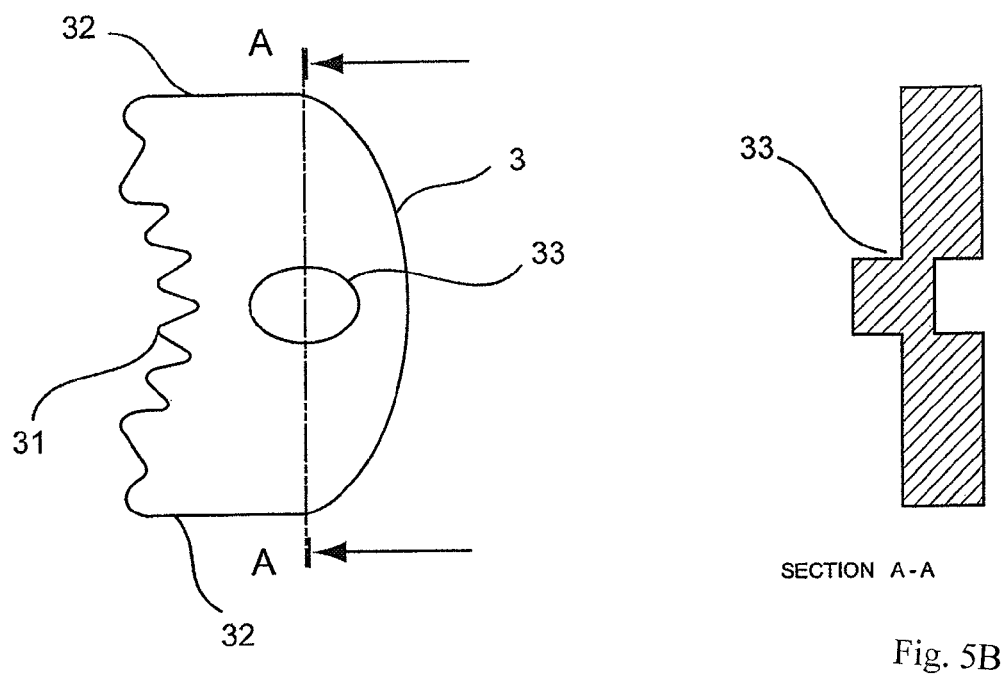
Fig. 5A
Fig. 5B
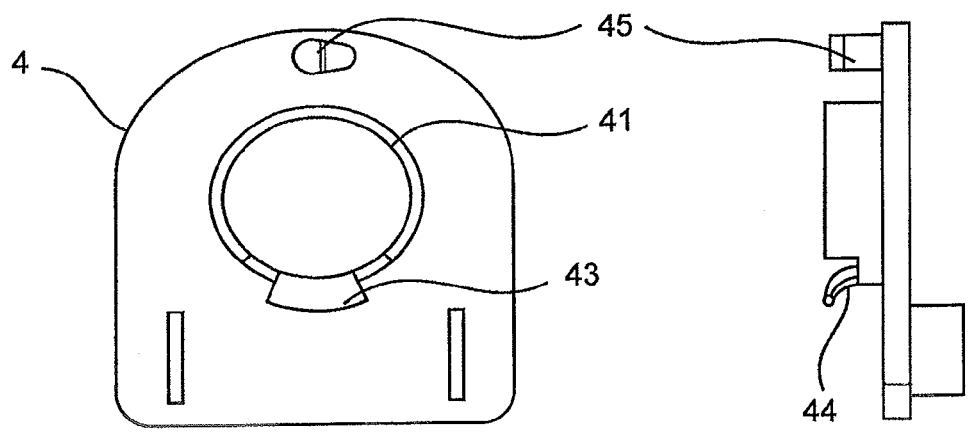
Fig. 6A
Fig. 6B
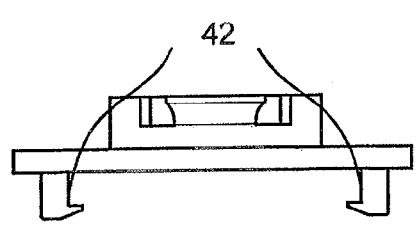
Fig. 6C

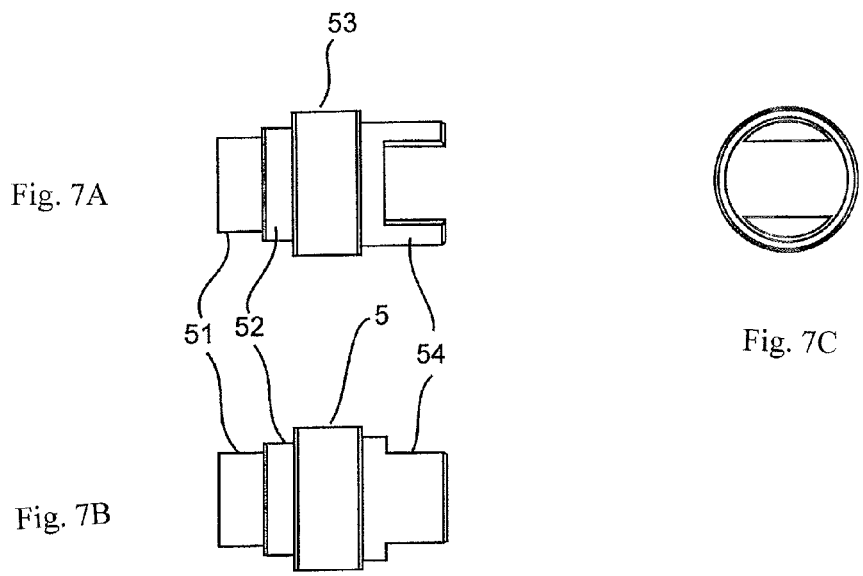
Fig. 7A
Fig. 7B
Fig. 7C
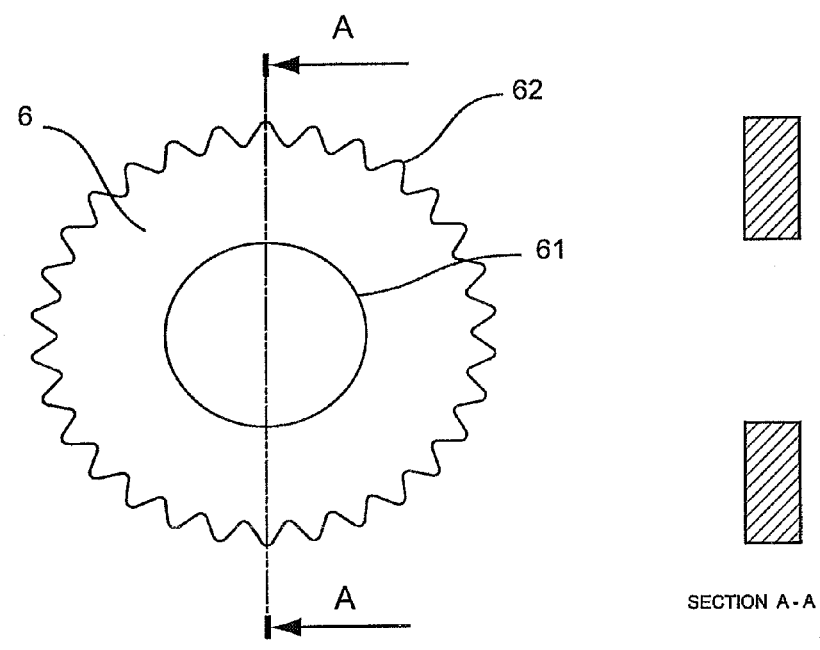
Fig. 8A
Fig. 8B
SECTION A-A

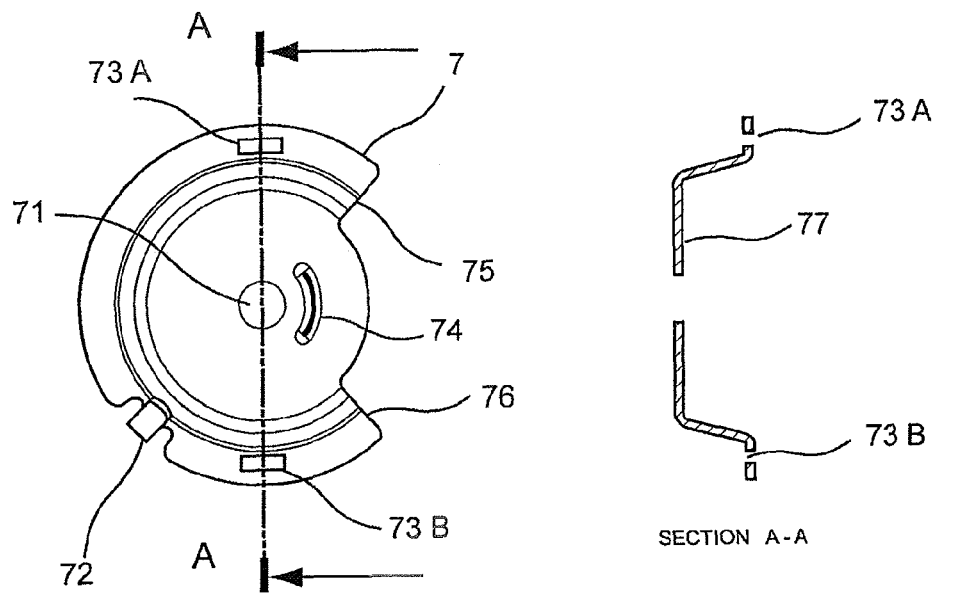
Fig. 9A
Fig. 9B
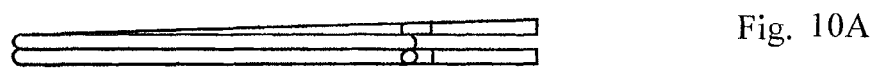
Fig. 10A
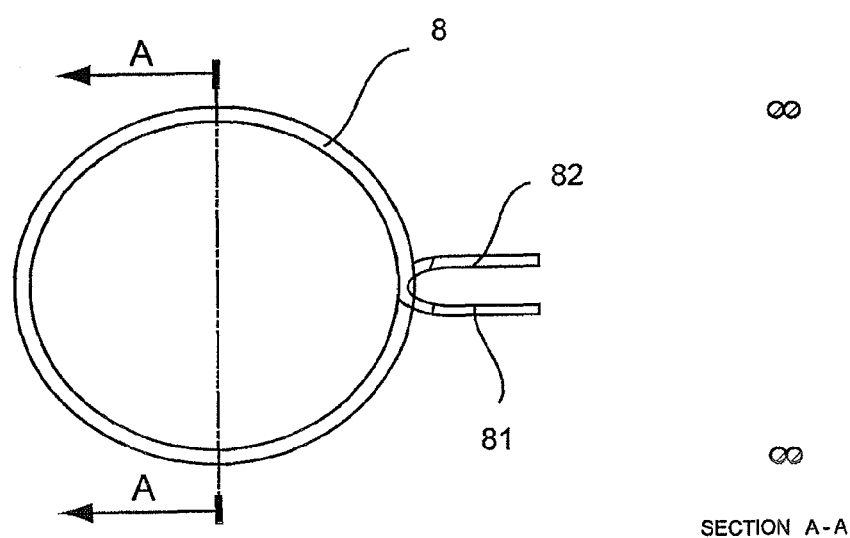
Fig. 10B
Fig. 10C

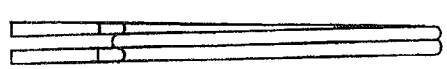
Fig 11A
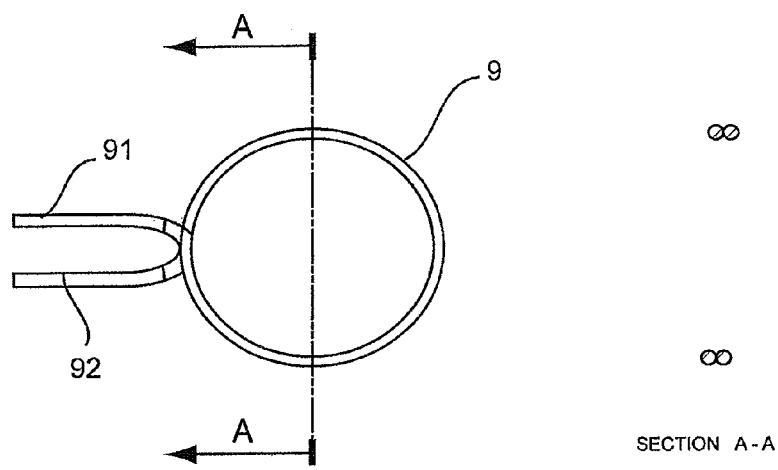
Fig. 11B
Fig. 11C
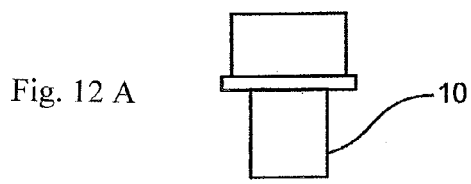
Fig. 12 A
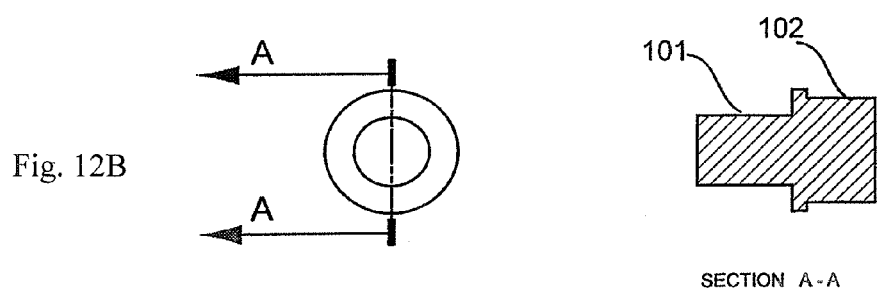
Fig. 12B
Fig. 12C

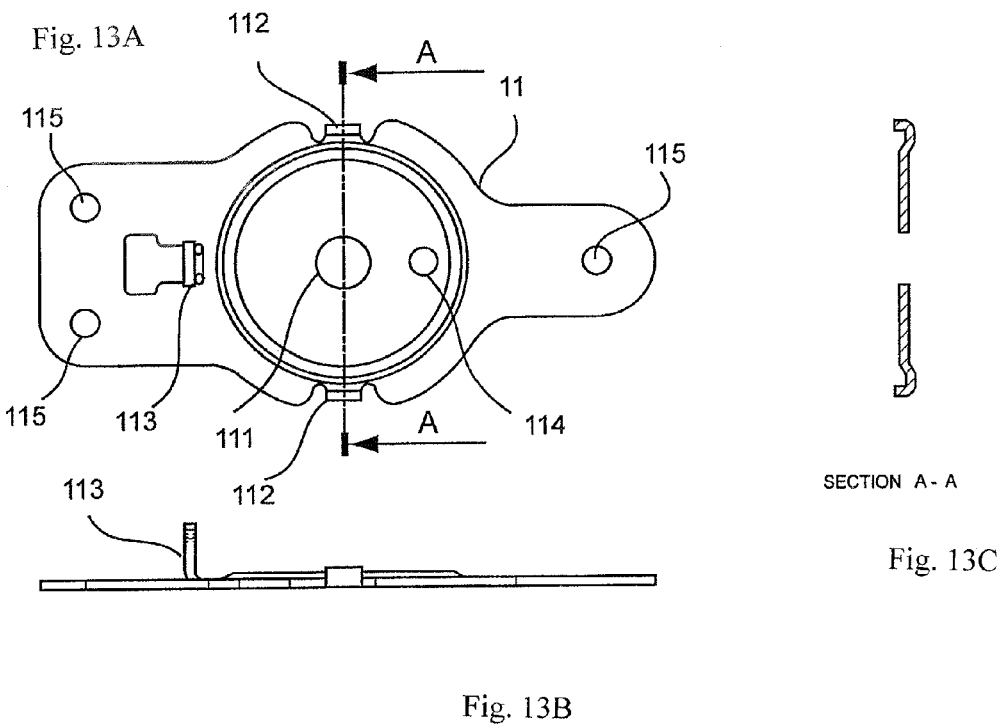
Fig. 13A
Fig. 13B
Fig. 13C
SECTION A-A
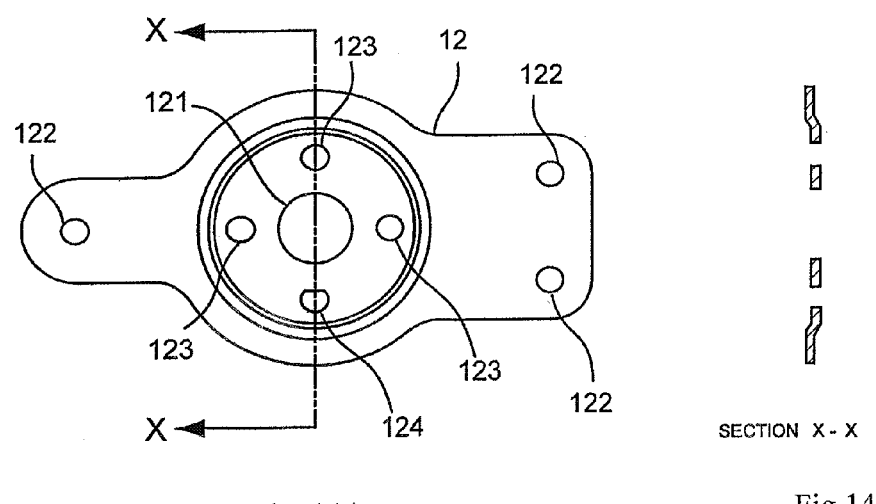
Fig. 14A
Fig 14B
SECTION X-X

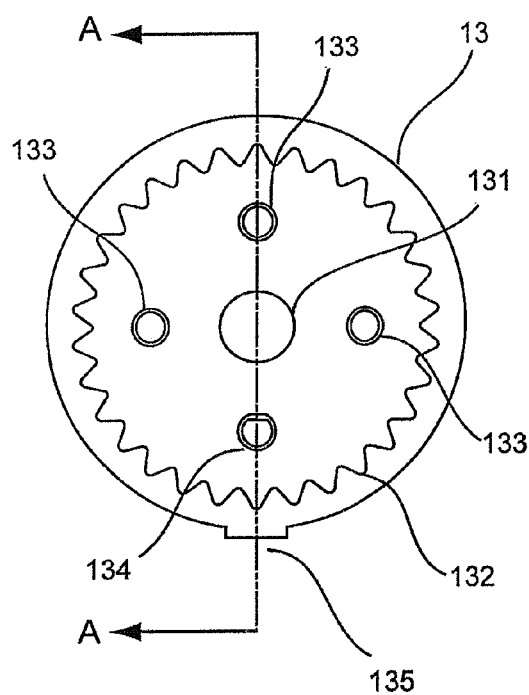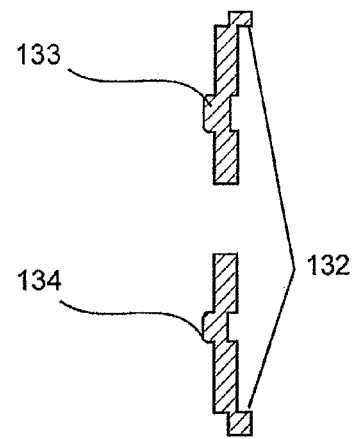
Fig. 15A
Fig. 15B

SECTION A-A

SECTION B-B

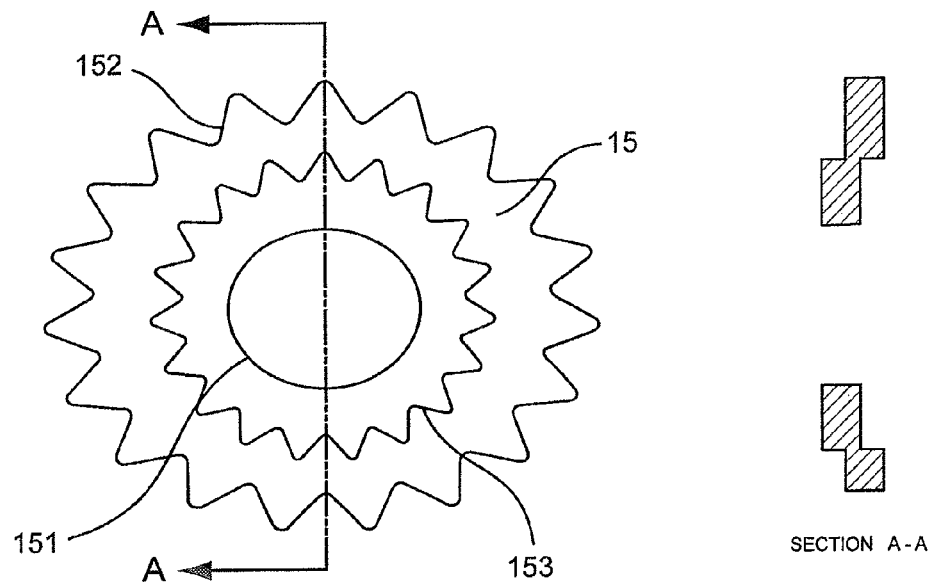
Fig 17A
SECTION A-A
Fig. 17B
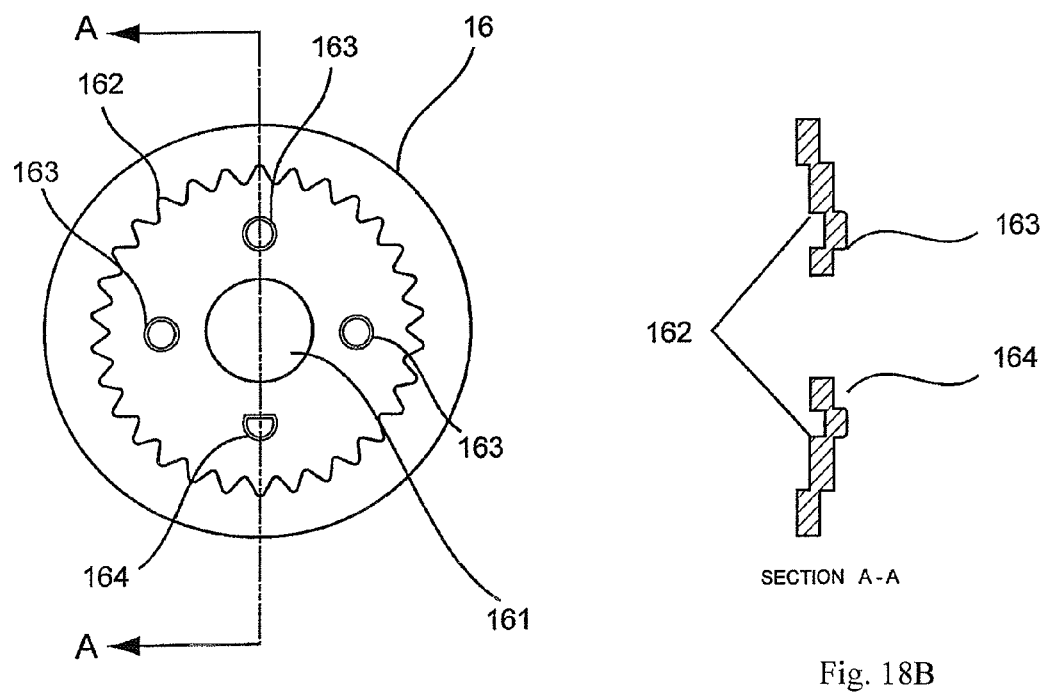
Fig. 18A
SECTION A-A
Fig. 18B

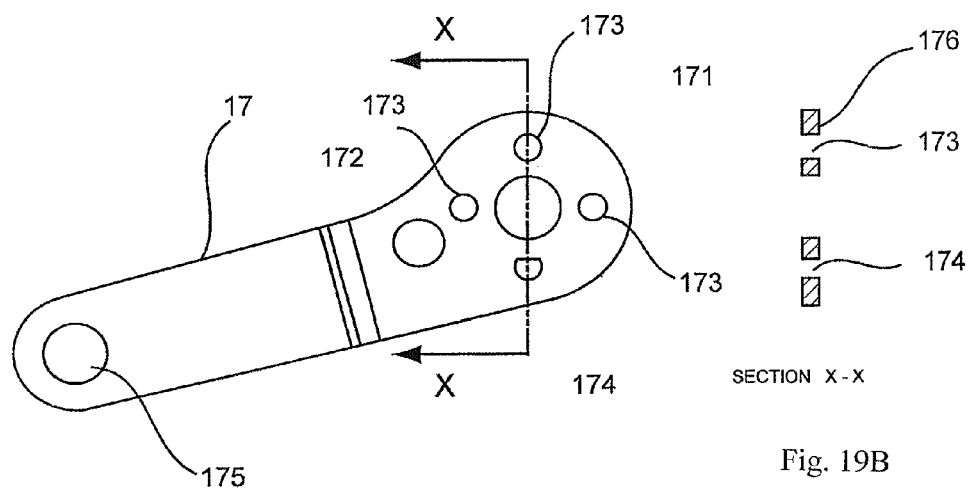
Fig. 19A
Fig. 19B
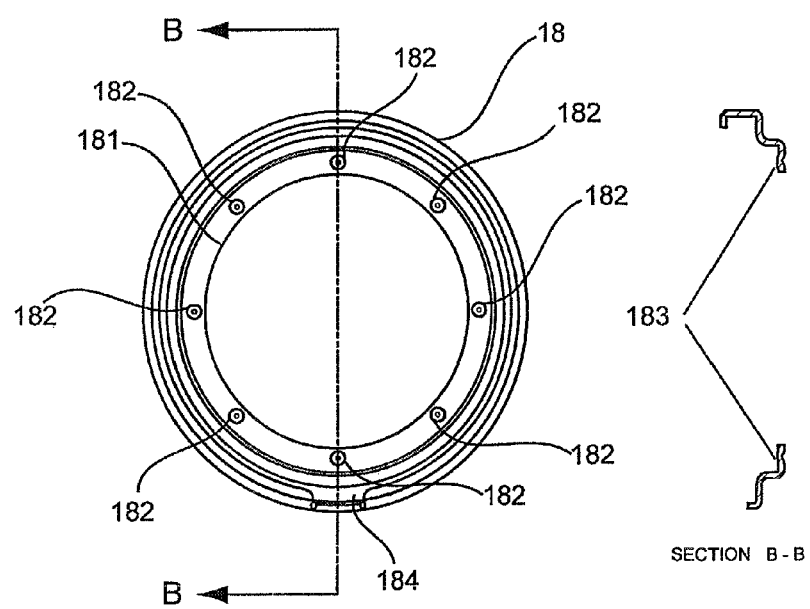
Fig. 20A
Fig. 20B

SEAT LIFTING ASSEMBLY

TECHNICAL FIELD

The present invention relates to a seat lifting assembly. More particularly, the invention relates to a seat lifting assembly fixed to lower structure of seat for moving the seat upwards or downwards with respect to floor. The lifting assembly may be used in vehicle seats as well as seats or track structures of any kind.

BACKGROUND

It is important to raise or lower the height of the seat for enhancing the occupant's comfort. There are various types of seat lifting assemblies available in the market which raise or lower the height of the seat by means of movement of lifting means. Seat lifting assemblies as described by the prior art have many disadvantages. The major disadvantage is that either the seat takes a long series of steps to reach the highest or the lowest position or moves in one step by the air pressure or by force of weight.

The seats which take a number of steps in reaching a particular position move with respect to the angular movement of the lifting means. The angular movement of lifting means is directly proportional to the height gained or lost by the seat. The seat lifting assemblies described in prior art have a lower range of value for the constant in said directly proportional equation. As a result, such types of seat lifting assemblies take unnecessarily longer time to reach a particular position and requires more manual labour.

The seats which move upward or downward in one step, do not quite reach the exact desired position easily. Thereby, increasing the number of steps required to reach the desired position.

One of the prior art U.S. Pat. No. 6,422,651 B1 describes a seat lifting assembly wherein the seat moves upward in a number of steps but comes down in lesser steps as greater angular freedom is provided to the lifting means. Now the need has aroused to develop such a seat lifting assembly where lesser angular movement of the lifting means provides larger increase or decrease in the height of the seat.

The present invention provides a seat lifting assembly having a lifting means, an assembly of gears, arrangement of shafts and link which provides higher movement to seat with respect to smaller angular movement of lifting means.

SUMMARY OF THE INVENTION

According to an embodiment of the invention, a seat lifting assembly comprising: a lifting means at one end of the seat lifting assembly; an arrangement of shafts along length of the seat lifting assembly, said arrangement comprising: an output shaft, and a cam shaft coupled with said output shaft; an assembly of gears supported by said arrangement of shafts for transmitting motion from said lifting means, said assembly of gears comprising: a first gear provided with a plurality of teeth on its periphery; a second gear placed next to said first gear, said second gear provided with a plurality of teeth embossed concentrically over the second gear; a third gear placed next to second gear being a stepped gear, said third gear comprising: a plurality of teeth provided on periphery of base of said third gear for engaging with said teeth of said second gear, and a plurality of teeth provided on periphery of riser; a fourth gear placed next to the third gear being a hat shaped gear, said fourth gear comprising: a plurality of teeth on periphery of brim part of hat shaped gear for engaging with said teeth of said third gear; a link placed next to said fourth gear for transmitting motion from the body of gears to a seat; wherein, when said lifting means is pushed or pulled, the first gear rotates, which in turn provides rotary motion to the arrangement of shafts, thereby eccentrically rotating the third gear such that said teeth of the third gear engage with said teeth of the second gear and said teeth of the third gear engage with said teeth of the fourth gear and provides a controlled motion to the fourth gear, from where the motion is transferred to the link, thus, lowering or raising the height of the seat.

According to another embodiment of the invention, output shaft comprises: a step provided at one end for supporting said lifting means, a step provided next to step for supporting said first gear, a step provided next to step, and a slot provided at another end for coupling with said cam shaft; said cam shaft comprises: an end coupled with said slot of the output shaft, a cam for providing eccentric motion to said third gear, and an end which passes through said link.

According to another embodiment of the invention, said first gear being circular in shape comprises: a hole at the centre through which said output shaft passes and receives the rotary motion; said second gear being circular in shape comprises: a hole at centre through which said cam shaft passes, and a projection at the circumference to act as an anti-rotation pin; said third gear being circular in shape comprises: a hole at the centre through which cam shaft passes and provides eccentric motion to said third gear; said fourth gear being circular in shape comprises: a hole at the centre through which said cam shaft passes, and four embosses on crown part of the hat type gear around said hole for transferring the rotary motion of said fourth gear to said link.

According to another embodiment of the invention, said lifting means is tapered and bent at centre and comprises: a hole at one end of the lifting means through which said step of said output shaft passes to provide support to said lifting means, and a V shaped slot provided near said hole.

According to another embodiment of the invention, the seat lifting assembly comprises: a pawl arcuate on at least one side for transferring motion from said lifting mean to said first gear, said pawl comprising: a plurality of teeth on arcuate side for engaging with said teeth of said first gear to provide the motion to said first gear, and a cylindrical projection at the centre operably connected to said V-shaped slot of said lifting means for engaging and disengaging said teeth of said pawl with said teeth of said first gear.

According to another embodiment of the invention, the seat lifting assembly comprises: a plate, said plate comprising: a hole at the centre through which said step of said output shaft passes to keep said plate in position, and two linear protrusions parallel to each other for holding and sliding said pawl along the protrusions during its engagement and disengagement with said first gear.

According to another embodiment of the invention, the seat lifting assembly comprises: a cover plate formed in a hat shape with opening in one quarter is placed at one end of the assembly for covering the assembly from one side, said cover plate comprising: two faces at the opened quarter to restrict the movement of said lifting means in upward and downward direction.

According to another embodiment of the invention, the seat lifting assembly comprises: a first spring provided to bring said lifting means back to its original position after being pulled or pushed, said first spring comprising: two extensions.

According to another embodiment of the invention, the seat lifting assembly, comprises: a stepped rivet being press fitted to said lifting means, said stepped rivet comprising: a step for supporting said extensions when said lifting means is pulled or pushed, and a step for preventing said first spring from coming out of its position during operation.

According to another embodiment of the invention, said link is formed out of a rectangular shape and comprises: a hole at one end through which said end of the cam shaft passes, a hole at other end, holes surrounding said hole to engage with said emboss of said fourth gear for holding the fourth gear, and an emboss near said hole towards other end of said link for controlling the movement of the link.

BRIEF DESCRIPTION OF DRAWINGS

FIG. 2A illustrates a front view thereof and FIG. 2B a cross sectional view of seat lifting assembly along line A-A.

FIG. 3A depicts a lifting means component thereof and FIG. 3B its cross sectional view.

FIG. 4A depicts a side view of a stepped rivet, FIG. 4B a top view thereof and FIG. 4C a its cross sectional view.

FIG. 5A depicts a pawl and FIG. 5B a cross sectional view of the same.

FIG. 6A depicts a plate and FIGS. 6B and 6C cross sectional views of the same.

FIG. 7A depicts top view of an output shaft and FIGS. 7B and 7C depict side and end views thereof.

FIG. 8A depicts first gear and FIG. 8B a cross sectional view of the same which receives motion from the pawl.

FIG. 9A depicts a cover plate which encloses the assembly from one end and FIG. 9B a cross sectional view of the same.

FIG. 10A depicts a top view of a first spring, FIG. 10B a side view thereof and FIG. 10C a cross sectional view of the same.

FIG. 11A depicts a top view of a first spring, FIG. 11B a side view thereof and FIG. 11C a cross sectional view of the same.

FIG. 12A depicts a side view of a stepped rivet, FIG. 12B a top view thereof and FIG. 12 C and FIG. 12 C a cross sectional view of the same.

FIG. 13A depicts a top view of a first bracket, FIG. 13B a side view thereof and FIG. 13C a cross sectional view of the same.

FIG. 14A shows the second bracket and FIG. 14B a cross sectional view of the same.

FIG. 15A shows the second gear and FIG. 15 B a cross sectional view of the same.

FIG. 17A shows third gear and FIG. 17B a cross sectional view of the same.

FIG. 18A shows third gear and FIG. 18B a cross sectional view of the same.

FIG. 19A depicts a link and FIG. 19B a cross sectional view of the same.

FIG. 20A shows an encapsulation ring for encapsulating the assembly and FIG. 20B a cross sectional view of the same.

Figure 1:
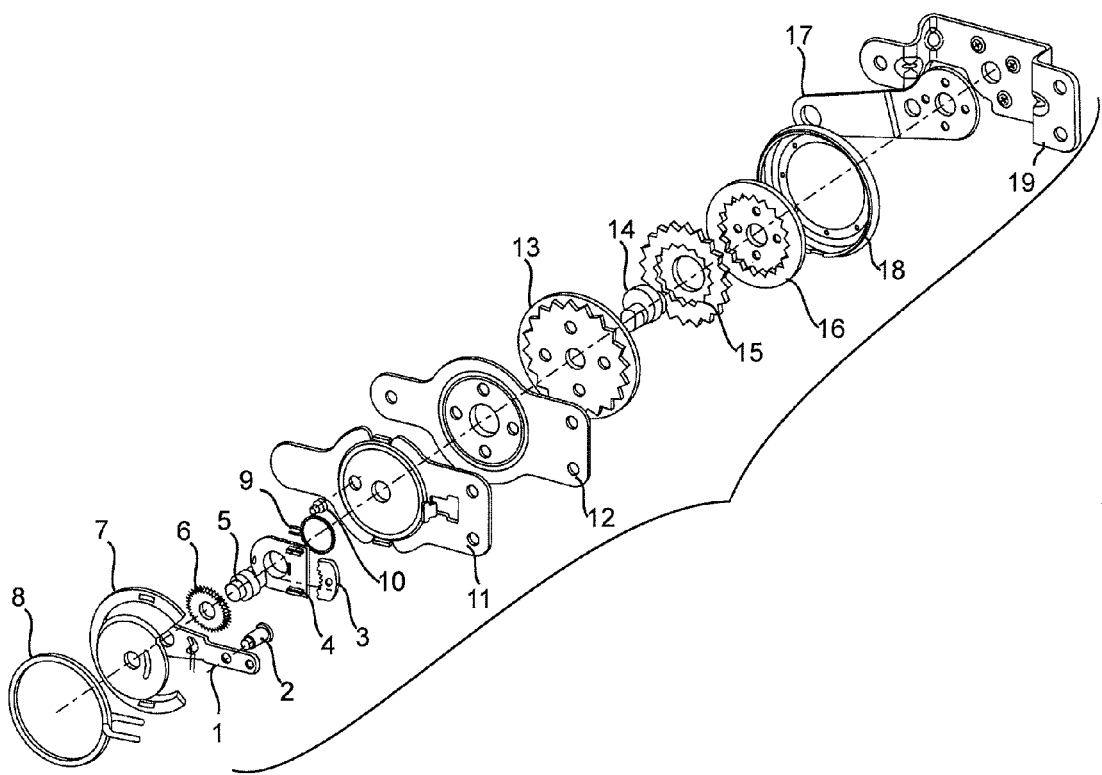
FIG. 1 illustrates an embodiment of present invention depicting the exploded view of the seat lifting assembly.

| Description of Elements | Reference numerals |
|---|---|
| Lifting means | 1 |
| hole | 200 |
| surface | 201 |
| V-shaped slot | 202 |
| Hole | 203 |
| Hole | 204 |
| Face | 205 |
| Stepped Rivet | 2 |
| Step | 21 |
| Step | 22 |
| Step | 23 |
| Pawl | 3 |
| Teeth | 31 |
| Sides | 32 |
| Cylindrical projection | 33 |
| Plate | 4 |
| Hole | 41 |
| Protrusion | 42 |
| Projection | 43 |
| Surface | 44 |
| Projection | 45 |
| Output Shaft | 5 |
| Step | 51 |
| Step | 52 |
| Step | 53 |
| Slot | 54 |
| First Gear | 6 |
| Hole | 61 |
| Teeth | 62 |
| Cover plate | 7 |
| Hole | 71 |
| Feature | 72 |
| Cutout | 73A |
| Cutout | 73B |
| Depression | 74 |
| Face | 75 |
| Face | 76 |
| Face | 77 |
| First Spring | 8 |
| Extension | 81 |
| Extension | 82 |
| Second Spring | 9 |
| Extension | 91 |
| Extension | 92 |
| Stepped rivet | 10 |
| Step | 101 |
| Step | 102 |
| First Bracket | 11 |
| Hole | 111 |
| Rectangular projection | 112 |
| T-projection | 113 |
| Hole | 114 |
| Hole | 115 |
| Second Bracket | 12 |
| Hole | 121 |
| Hole | 122 |
| Hole | 123 |
| Flattened hole | 124 |
| Second Gear | 13 |
| Hole | 131 |
| Teeth | 132 |
| Circular emboss | 133 |
| Flattened emboss | 134 |
| Rectangular projection | 135 |
| Cam Shaft | 14 |
| End | 141 |
| Cam | 142 |
| End | 143 |
| Third gear | 15 |
| Hole | 151 |
| Teeth | 152 |
| Teeth | 153 |
| Fourth Gear | 16 |
| Hole | 161 |
| Teeth | 162 |
| Emboss | 163 |
| Flattened emboss | 164 |
| Link | 17 |
| Hole | 171 |
| Emboss | 172 |
| Hole | 173 |
| Hole | 174 |
| Hole | 175 |
| Encapsulation ring | 18 |
| Opening | 181 |
| Emboss | 182 |
| Surface | 183 |
| Cutout | 184 |
| Bracket | 19 |

-continued

| Description of Elements | Reference numerals |
| --- | --- |
| Hole | 191 |
| Projection | 192 |
| Hole | 193 |
| Face | 194 |
| Face | 195 |
| Surface | 196 |

DETAILED DESCRIPTION OF THE INVENTION

The present invention can be more fully understood by reading the following detailed description of some of the embodiments, with reference made to the accompanying drawings.

FIG. 1 illustrates an exploded view of the seat lifting assembly according to an embodiment of the present invention. A lifting means (1) as shown in the figure is bent at the centre and provided with different holes and slots. A stepped rivet (2) is press fitted in one of the holes of the lifting means (1). The seat lifting assembly as shown in the figure is provided with an arrangement of shafts consisting of an output shaft (5) and a cam shaft (14). Both the output shaft (5) and the cam shaft (14) are provided along the length of the assembly and are coupled with each other. A pawl (3) is having teeth at one of its sides. As shown in the figure, a plate (4) having one semi-circular face and other three straight faces, is provided with two protrusions parallel to each other wherein the pawl (3) slides and the teeth of the pawl (3) engages with teeth provided on the periphery of first gear (6). As shown in the FIG. 1, the seat lifting assembly is provided with an assembly of gears, comprising, the first gear (6), a second gear (13), a third gear (15) and a fourth gear (16). All said gears are placed one after the other along the length of the assembly and connected through said output shaft (6) or cam shaft (14). A cover plate (7) with a hole at the centre is provided to cover the assembly from one end. An output shaft (5) as shown in the figure is stepped and provided for giving support to the cover plate (7), first gear (6) and plate (4). The seat lifting assembly is also provided with a first spring (8) at one end, having two extensions. Second spring (9) having two extensions as shown in the figure, is placed near the plate (4). First bracket (11) as shown in the FIG. 1 is provided a circular portion in the centre and with different holes. It also has two projections hundred and eighty (180) degree apart to lock the first bracket (11) with the cover plate (7). The extensions of said second spring (9) are held by a stepped rivet (10) which is press fitted in one of the holes of the first bracket (11). Second bracket (12) placed next to first bracket (11) is also having a circular portion in the centre and provided with different holes. As shown in the FIG. 1, second gear (13) having hole at centre and teeth embossed concentrically is placed next to the second bracket (12). Third gear (15) having hole at centre and plurality of teeth is placed next to second gear (13) and fourth gear (16) with a hole at centre and plurality of teeth is placed next to third gear in the seat lifting assembly. The cam shaft (14) passes through second bracket (12), second gear (13), third gear (15), fourth gear (16) and link (17). An encapsulation ring (18) is provided next to the forth gear (16) to enclose the whole seat lifting assembly in a compact form. The end of the seat lifting assembly is provided with bracket (19).

FIG. 2 illustrates the cross sectional view of an embodiment of the seat lifting assembly.

FIG. 3 shows the lifting means (1). The lifting means (1) is tapered and bent at the centre. The bent and tapered end of the lifting means (1) is larger than the other end. A hole (200) is provided at the larger end through which the output shaft passes and provides support to the lifting means (1). A hole (204) is provided at smaller end of the lifting means (1) through which handle, fixed to lower structure of seat, is connected. The handle is pulled or pushed by the occupant in order to move the seat upward or downward. The lifting means (1) receives its motion from the movement of handle, by the occupant of the seat. The lifting means is further provided with a hole (203) near said hole (204) to accommodate one end of stepped rivet (2). Further a V-shaped slot (202) is provided near the hole (200). Said V-shaped slot (202) has two parallel flat surfaces (201) as shown in the FIG. 3. The pawl (3) is operably connected to said lifting means (1) through the V-shaped slot (202). FIG. 3 also depicts the cross sectional view of the lifting means (1) depicting a face (205). The gaps as shown in the cross-sectional view, depict the hole (200), V-shaped slot (202), hole (203) and hole (204).

FIG. 4 depicts the stepped rivet (2). The stepped rivet (2) has three steps (21, 22 and 23). The stepped rivet (2) is press fitted in the hole (203) of the lifting means (1) through step (21). Step (22) of stepped rivet (2) provides support to the extension of first spring (8) and helps in creating torsion in said first spring (8) when the lifting means (1) is pulled or pushed by means of the handle. Step (23) of stepped rivet (2) prevents the first spring (8) from coming out from the seat lifting assembly. The stepped rivet (2) is cylindrical in shape and step (21) is consistent with the hole (203) of the lifting means (1).

Pawl (3) as shown in FIG. 5 is having a shape of a rectangle with two parallel arcuate sides and two parallel straight sides (32). One of the arcuate sides is provided with a plurality of teeth (31) to engage with the teeth of first gear (6). The teeth (31) of pawl (3) are consistent with the teeth of the first gear (6). In the present embodiment, the teeth are provided with a V-shape. The pawl (3) is further provided with a cylindrical projection (33) at the centre which is operably connected to the V-shaped slot (202) of the lifting means (1). When the lifting means (1) is pulled or pushed by means of the handle, the cylindrical projection (33) slides in the V-shaped slot (202) by following the flat surfaces (201) of the lifting means (1) and thereby making the straight sides (32) of the pawl (3) slide in the protrusions of said plate (4) towards the first gear (6) in order to engage the teeth (31) of the pawl (3) with teeth of the first gear (6). The further movement of the lifting means (1) provides angular movement to the engaged pawl (3) thereby rotating the first gear (6). When the lifting means (1) comes back to its normal position, the cylindrical projection (33) again slides in the V-shaped slot (202) by following the flat surfaces (201) of the lifting means (1). This makes the straight sides (32) of the pawl (3) slide back in the protrusions of said plate (4) in order to disengage the teeth (31) of the pawl (3) with teeth of the first gear (6). The FIG. 5 also shows the cross-sectional view of the pawl (6) with th cylindrical projection (33).

FIG. 6 shows the plate (4) placed after the first gear (6) in the seat lifting assembly. The plate (4) is having one semi circular face and other three straight faces with round corners. The plate (4) is provided with a hole (41) at the centre through which output shaft (6) passes to keep said plate (4) in position. As shown in the FIG. 6, the plate (4) is provided with two linear protrusions (42) affixed parallel to side straight faces for holding said pawl (3). During engagement and disengagement of the teeth (31) of pawl (3) with the teeth of said first gear (6), the pawl (3) slides along said protrusions (42). As shown in the FIG. 6, the protrusions (42) are slightly inwardly tapered at the top so that the pawl (3) does not come out of the protrusions (42). The plate (4) is having a projection (45) near semi-circular face to hold the extension of said second spring (9). A projection (43) adjacent to inner circumference of said hole (41) is provided at hundred and eighty (180) degree apart from said projection (45) to hold said second spring (9) in position. The second spring (9) is encircled over surface (44)

as shown in the figure. In the present embodiment the plate (4) is made up of plastic for providing durability and light weight to the seat lifting assembly. The plate (4) does not rotate and remains stationary in the seat lifting assembly.

FIG. 7 depicts an output shaft (5) which is placed along length of the seat lifting assembly. The output shaft (7) is a stepped shaft. It is provided with three steps at one end and a slot (54) at other end. Step (51) as shown in the figure is the lowest step which passes through the hole (200) of lifting means (1) and central hole of the cover plate (7). The step (51) provides support to both the cover plate (7) and lifting means (1). The step (52) is the second step which holds the first gear (6). Whenever the first gear (6) rotates, the output shaft receives this rotary motion of the first gear (6) from said step (52) and rotates in the direction of the first gear (6). The step (53) is the highest step which passes through the hole (41) of the plate (4) and provides support to the plate (4). As shown in the figure, the other end of the output shaft (5) is provided with a slot, rectangular in shape. The slotted end of the output shaft (5) is coupled with the cam shaft (14) to form an arrangement of shafts in the seat lifting assembly.

FIG. 8 shows the first gear (6) which is placed after the lifting means (1) in the seat lifting assembly. The first gear is having a shape of a circular disc. It is provided with a hole (61) at the centre through which the step (52) of the output shaft (5) passes. The first gear is further provided with a plurality of teeth on its periphery for engaging with the teeth (31) of pawl in order to receive the rotary motion. In the present embodiment, the teeth are having a V-shape. The rotary motion so received is then transferred to the output shaft (5) via step (52). The first gear (6) and the output shaft rotates in the same direction during seat lifting or dropping operation. FIG. 8 also depicts the cross sectional view of the first gear (6). The gap as shown in the cross-sectional view depicts the hole (61).

Cover plate as shown in FIG. 9 is formed in a hat shape with an opening in one quarter. The cover plate (7) is placed at one end of the assembly for covering the assembly from one side. It is provided with a hole (71) in centre of crown part of hat shaped portion. The crown part of the cover plate (7) is named as face (77) as shown in the cross-sectional view of the cover plate (7). The step (51) of the output shaft (5) passes through said hole (71) to provide support to the cover plate (7). A facet (72) on brim part of hat shaped cover plate (7) is provided to hold said first spring (8) in position. The cover plate (7) is further provided with two cutouts (73A, 73B) each of which are hundred and eighty (180) degree apart from the other, on peak part of hat shaped cover plate (7). These cutouts (73A, 73B) are to lock the seat lifting assembly. A depression (74) near said hole (71) is provided to avoid full contact between face (205) of said lifting means (1) and the face (77) of cover plate (7). Further, two faces (75, 76) are provided at the opened quarter to restrict the movement of said lifting means (1) in upward and downward directions.

FIG. 10 depicts first spring (8) used for bringing back the lifting means (1) from pulled of pushed position to its normal position. In the present embodiment, the first spring (8) is made of wire. Usually the spring is made of number of rounds, however in the present embodiment the first spring (8) is made of two rounds of wire. As shown in the figure the first spring (8) has two extensions (81 and 82). The extension (81) is rested against the step (22) of the stepped rivet (2) and the extension (82) is hooked to the first bracket (11) when the lifting means (1) is pushed. The extension (82) is rested against the step (22) of the stepped rivet (2) and the extension (81) is hooked to the first bracket (11) when the lifting means (1) is pulled. When the lifting means (1) is pushed or pulled, the extension (81) rested against the step (22) of the stepped rivet (2) gets pushed or pulled along with the lifting means (1). This generates torsion in the first spring (8) and helps in bringing the lifting means (1) back to its normal position when released.

FIG. 11 shows the second spring (9). In the present embodiment, the second spring (9) is made of wire. The spring can be made of number of rounds, however in the present embodiment the second spring (9) is made of two rounds of wire. As shown in the figure, the second spring (9) has two extensions (91 and 92). The extension (91) is rested against the step (101) of the stepped rivet (10) and the extension (92) is hooked to the projection (45) on the plate (4). This keeps the second spring (9) preloaded.

A stepped rivet (10) as shown in the FIG. 12 is a two-stepped rivet. The stepped rivet (10) is cylindrical in shape and is provided to keep the second spring (9) preloaded. Step (101) is provided to hold the extension (91) of the second spring (9) in position. Further, step (102) is press fitted in the first bracket (11).

FIG. 13 depicts the first bracket (11) placed next to said plate (4) in the seat lifting assembly. The first bracket (11) is formed with stamped circular portion in the centre and two extensions being hundred and eighty (180) degree apart. A hole (111) is provided at the centre of the stamped circular portion for holding said slot (54) of said output shaft (5). The first bracket (11) is provided with two projections (112A, 112B) at hundred and eighty (180) degree apart adjacent to the circumference of the stamped circular portion to engage with the cutouts (73A, 73B) of the cover plate (7). The engagement of the projections (112A, 112B) and the cutouts (73A, 73B) lock the first bracket (11) with said cover plate (7). Further a T-projection (113) as shown in the FIG. 13 is provided at one side of the first bracket (11). Said T-projection (113) is provided to hold said extension (81, 82) of the first spring (8) in position when the lifting means (1) is pulled or pushed. A hole (114) is provided along the diameter of the stamped circular portion being ninety (90) degree apart from the projections (112A, 112B). The step (102) of the stepped rivet (10) is press fitted in said hole (114). Further, holes (115) are provided at each extension of said bracket (11). The holes (115) are three in number and provided to fix the first bracket (11) to second bracket (12).

FIG. 14 shows the second bracket (12) placed next to said first bracket (11) in the seat lifting assembly. The second bracket (12) is formed with a stamped circular portion in the centre and two extensions being hundred and eighty (180) degree apart. A hole (121) is provided at the centre of the stamped circular portion for holding the cam shaft (14). Further three holes (122) are provided at each extension of said second bracket (12) to fix said second bracket (12) to said first bracket (11) through the holes (115) of first bracket (11). As shown in the figure, the second bracket (12) is provided with three holes (123) and one flattened hole (124) on the stamped circular portion to hold said second gear (13).

The second gear (13) as shown in the FIG. 15 is placed next to the second bracket (12) in the seat lifting assembly. The second gear is in the shape of a circular disc. A hole (131) is provided at centre of this circular disc through which said cam shaft (14) passes. The second gear (13) is provided with a plurality of V-shaped teeth (132) which are embossed concentrically over the second gear (13). Further, the second gear is provided with three embosses (133) and one flattened emboss (134) to engage with said holes (123) and flattened hole (124) of said second bracket (12) respectively. The second gear (13) is provided with a flattened emboss (134) and the second bracket is provided with a flattened hole (124) to avoid any mismatch in the orientation during assembly of the embodiments. The second gear (13) acts as an idle gear and does not rotate at all in the seat lifting assembly. To achieve this idle status, the second gear is provided with a projection (135) at the circumference which acts as an anti-rotation pin.

Figure 16A:
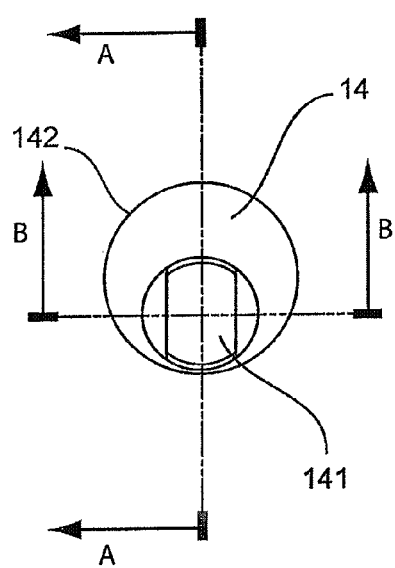
FIG. 16A depicts cam shaft and FIGS. 16B and 16C cross sectional views of the same along the lines A-A and B-B.
Figure 16B:
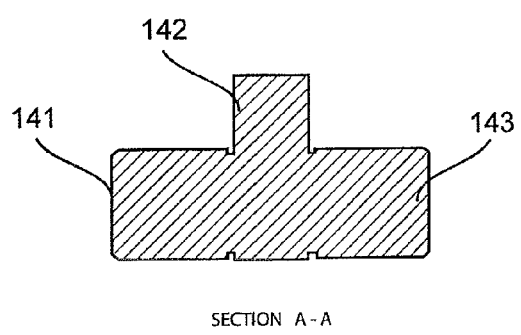
Figure 16C:
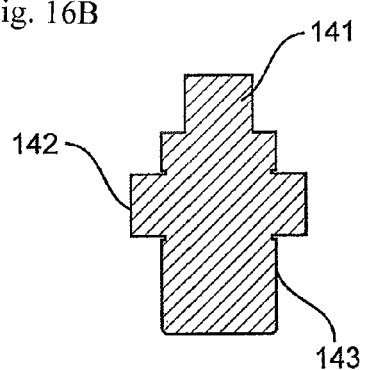

FIG. 16 depicts a cam shaft (14) which is coupled with the output shaft (5) along the length of the seat lifting assembly. As shown in the section B-B of the FIG. 16, the cam shaft (14) is provided with three steps at one end and one step at another end. The cam shaft (14) has an end (141), which is rectangular in shape. Said end (141) is coupled with slot (54) of the output shaft in the seat lifting assembly. The cam shaft receives rotary motion from the rotation of the output shaft (5) through end (141). Further, the second gear (13) is placed on the end (141) of the cam shaft (14). As shown in the FIG. 16, the cam shaft (14) is provided with a cam (142) for providing eccentric motion to said third gear (15). The cam (142) has a circular surface and passes through the hole of third gear. An end (143) of the cam shaft is cylindrical and gives out the required rotation. The end (143) passes through fourth gear (16) and the link (17).

The third gear (15) as shown in the FIG. 17 is placed next to the second gear (13) in the seat lifting assembly. The third gear (15) is a circular and stepped gear having a base part and a step. It is provided with a hole (151) at the centre through which the cam (142) of cam shaft (14) passes and provides eccentric motion to the third gear (15). A plurality of teeth (152) are provided on periphery of base part of said third gear (15) for engaging with said teeth (132) of said second gear (13). Further, a plurality of teeth (153) is provided on periphery riser part of the step. The plurality of teeth (152 and 153) are having V-shape in the present embodiment. When the cam (142) of the cam shaft provides eccentric motion to the third gear, the teeth (152) of the present gear engage themselves with the teeth (132) of the second gear (13) while rotating.

The fourth gear (16) as shown in the FIG. 18 is placed next to the third gear (15) in the seat lifting assembly. The fourth gear (16) is a hat shaped gear having a circular shape. A hole (161) is provided at the centre of the fourth gear (16) through which said end (143) of the cam shaft (14) passes. It is also provided with a plurality of teeth (162) on periphery of brim part of hat shaped gear for engaging with said teeth (153) of said third gear (15). The third gear rotates by engaging the teeth (152) of the third gear (15) with the teeth (132) of the second gear (13) and the teeth (153) of third gear (15) with the teeth (162) of the fourth gear (16). This rotation results in the rotation of the fourth gear (16). Further, three embosses (163) and a flattened emboss (164) is provided on crown part of the circular hat type fourth gear (16) around said hole (161) for transferring the rotary motion of said fourth gear (16) to said link (17).

FIG. 19 depicts a link (17) which receives the rotary motion from the fourth gear (16) in a controlled manner and moves the seat upward or downward. The link (17) is formed out of a rectangular shape and placed next to fourth gear in the seat lifting assembly. It comprises a hole (171) at one end through which said end (142) of the cam shaft (14) is passes. Three holes (173) and a flattened hole (174) are provided in the link (17) surrounding the hole (171). These holes (173, 174) are provided to engage with said embosses (163, 164) of said fourth gear (16) respectively. The link receives the rotary motion through the engagement of embosses (163, 164) with the holes (173, 174). The link (17) is further provided with an emboss (172) near said hole (173) towards other end of said link (17) for further controlling the movement of the link (17). Further, a hole (175) at other end is provided, which is connected with the input link of the seat lifting assembly to provide controlled motion to the seat.

FIG. 20 shows an encapsulation ring (18) placed next to fourth gear (16) in the seat lifting assembly. It is formed in a shape of a cup for encapsulating or enclosing the whole seat lifting assembly in a compact form. A broad opening (181) is provided at centre of the surface of cup shaped encapsulation ring (18) to allow the engagement of said holes (173, 174) of the link (17) with said emboss (163, 164) of the fourth gear (16). A projection (182) on surface of the cup shaped encapsulation ring is provided to avoid direct contact between said fourth gear (16) and the encapsulation ring (18). Further, a cutout (184) on the rim of the cup shaped encapsulation ring (18) is provided for engaging with said projection (135) of the second gear (13) to acts as anti rotation pin. This engagement of cutout (184) of encapsulation ring (18) and the projection (135) of the second gear (13) prevents the encapsulation ring to rotate over the third gear (15) or fourth gear (16) and also prevents the second gear (13) from rotating.

Figures 21A, 21B:
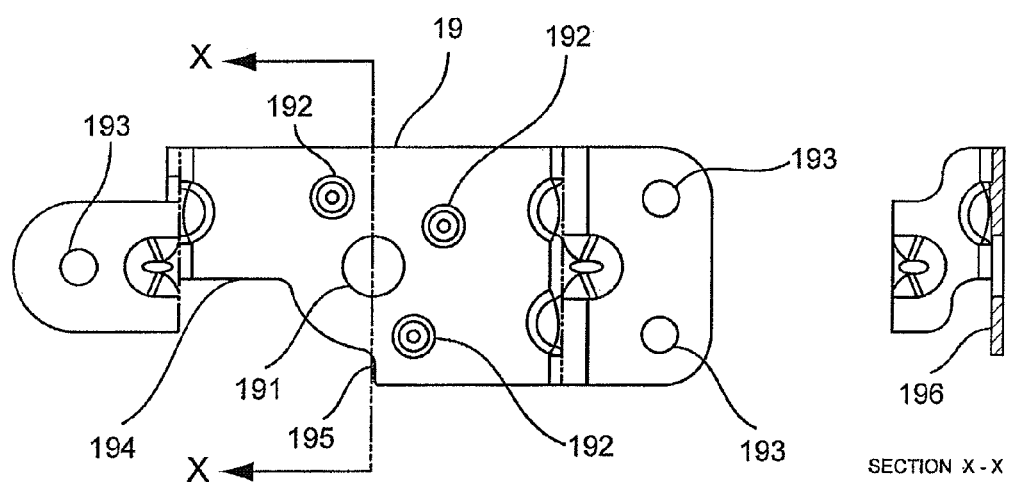
FIG. 21A depicts a bracket for providing support to the seat lifting assembly and FIG. 21B a cross sectional view of the same.

FIG. 21 shows a bracket (19) having an opening in one quarter of base part being placed next to said link (17) in the seat lifting assembly. A hole (191) is provided at centre of base part to accommodate said end (143) of said cam shaft (14). Further, projections (192) embossed around said hole (191) to prevent direct contact of said bracket (19) with said link (17). Holes (193) are provided on flange of bracket for clamping the seat lifting assembly together. As shown in the figure, faces (194, 195) are provided at opening of base part to control the movement of said link (17) in upward and downward direction.

In an embodiment of the present invention when the lifting means (1) is pushed downward, an extension (81) of the first spring (8) hooked to the middle step (22) of the stepped rivet (2) is pulled in a direction of the lifting means (1), the cylindrical projection (33) of the pawl (3) follows the flat surface (201) of the lifting means (1) thereby making the pawl (3) slide in the protrusions (42) of the plate (4). This sliding results in the engagement of the teeth (31) of the pawl (3) with the teeth (62) of the first gear (6). The further movement of the lifting means (1) results in the movement of the engaged pawl (3) which in turn rotates the first gear (6) in the direction of the lifting means (1). In the present case the first gear rotates in a clock-wise direction. The output shaft (5) receives this rotary motion from the first gear (6) through step ( ) and transfers said motion to the cam shaft (14) through said slot (54) of the output shaft (5). As a result, the cam (142) of the cam shaft (14) rotates eccentrically. This eccentric motion rotates the third gear (15) eccentrically such that teeth (152) of third gear (15) engage with the teeth (132) of the second gear (13) and teeth (153) of third gear (15) engage with the teeth (162) of fourth gear (16). The second gear (13) remains idle and do not rotate. It only provides a path for the rotation of third gear (15). The eccentric rotation of third gear (15) with respect to fourth gear (16) provides a controlled rotary motion to the fourth gear (16). The embosses (163, 164) provided on fourth gear (16) transfer this controlled motion to the link (17) through holes (173, 174) provided on the surface of link (17) and enable the link (17) to move upwards. The emboss (172) further controls the movement of link (17). The connection of link with input link moves the seat lifting assembly downward, thus, lowering the height of the seat. When the lifting means (1) is released by the occupant, it comes back to its original position noiselessly due to torsion created in the first spring (8).

In the similar manner when the lifting means (1) is pulled upwards, the link moves downwards which in turn raises the height of the seat.

We claim:
1. A seat lifting assembly comprising:
   a lifting means (1) at one end of the seat lifting assembly;
   an arrangement of shafts along a length of the seat lifting assembly, said arrangement comprising:
      an output shaft (5), and
      a cam shaft (14) coupled with said output shaft (5);
   an assembly of gears supported by said arrangement of shafts for transmitting motion from said lifting means (1), said assembly of gears comprising:
      a first gear (6) provided with a plurality of teeth (62) on its periphery;

a second gear (13) placed next to said first gear (6), said second gear provided with a plurality of teeth (132) embossed concentrically over the second gear;

a third gear (15) placed next to said second gear (13) being a stepped gear, said third gear comprising a base and a raised step and having:
- a plurality of teeth (152) provided on a periphery of the base of said third gear for engaging with said teeth (132) of said second gear (13), and
- a plurality of teeth (153) provided on a periphery of the raised step;

a fourth gear (16) placed next to the third gear (15) being a gear having an outer brim and a stepped inner portion with a central hole (161), said fourth gear comprising:
- a plurality of teeth (162) on the inner periphery of the brim part for engaging with said teeth (153) of said third gear (15);

a link (17) placed next to said fourth gear (16) for transmitting motion from the assembly of gears to a seat;

wherein, when said lifting means (1) is pushed or pulled, the first gear (6) rotates, which in turn provides rotary motion to the arrangement of shafts, thereby eccentrically rotating the third gear (15) such that said teeth (152) of the third gear (15) engage with said teeth (132) of the second gear (13) and said teeth (153) of the third gear (15) engage with said teeth (162) of the fourth gear (16) and provides a controlled motion to the fourth gear (16), from where the motion is transferred to the link (17), thus, lowering or raising the height of the seat.

2. The seat lifting assembly as claimed in claim 1, wherein: said output shaft (5) comprises:
- a first step (51) provided at one end for supporting said lifting means (1),
- a second step (52) provided next to said first step (51) for supporting said first gear (6),
- a third step (53) provided next to said second step (52), and
- a slot (54) provided at another end for coupling with said cam shaft (14);

said cam shaft (14) comprises:
- a first end (141) coupled with said slot (54) of the output shaft (5),
- a cam (142) for providing eccentric motion to said third gear (15), and
- a second end (143) which passes through said link (17).

3. The seat lifting assembly as claimed in claim 1, wherein: said first gear (6) being circular in shape comprises:
- a hole (61) at the centre through which said output shaft (5) passes and receives the rotary motion;

said second gear (13) being circular in shape comprises:
- a hole (131) at centre through which said cam shaft (14) passes, and
- a projection (135) at the circumference to act as an anti-rotation pin;

said third gear (15) being circular in shape comprises:
- a hole (151) at the centre through which cam shaft (14) passes and provides eccentric motion to said third gear (15);

said fourth gear (16) being circular in shape comprises:
- a hole (161) at the centre through which said cam shaft (14) passes, and four embosses (163, 164) on said stepped inner part of the fourth gear around said hole therein (161) for transferring the rotary motion of said fourth gear (16) to said link (17).

4. The seat lifting assembly as claimed in claim 1, wherein said lifting means (1) is tapered and bent at centre and comprises:
- a hole (200) at one end of the lifting means (1) through which said step (51) of said output shaft (51) passes to provide support to said lifting means (1), and
- a V shaped slot (202) provided near said hole (200).

5. The seat lifting assembly as claimed in claim 1, comprising:
- a pawl (3) arcuate on at least one side for transferring motion from said lifting means (1) to said first gear (6), said pawl comprising:
  - a plurality of teeth (31) on arcuate side for engaging with said teeth (62) of said first gear (6) to provide the motion to said first gear (6), and
  - a cylindrical projection (33) at the centre operably connected to said V-shaped slot (202) of said lifting means (1) for engaging and disengaging said teeth (31) of said pawl (3) with said teeth (62) of said first gear (6).

6. The seat lifting assembly as claimed in claim 1, comprising:
- a plate (4), said plate comprising:
  - a hole (41) at the centre through which a step (55) of said output shaft (5) passes to keep said plate (4) in position, and
  - two linear protrusions (42) parallel to each other for holding and sliding said pawl (3) along the protrusions (42) during its engagement and disengagement with said first gear (6).

7. The seat lifting assembly as claimed in claim 1, comprising:
- a cover plate (7) with an opening in one quarter is placed at one end of the assembly for covering the assembly from one side, said cover plate comprising:
- two faces (75, 76) at the opened quarter to restrict the movement of said lifting means (1) in upward and downward direction.

8. The seat lifting assembly as claimed in claim 1, comprising:
- a first spring (8) provided to bring said lifting means (1) back to its original position after being pulled or pushed, said first spring comprising:
- two extensions (81, 82).

9. The seat lifting assembly as claimed in claim 8, comprising:
- a stepped rivet (2) being press fitted to said lifting means (1), said stepped rivet comprising:
  - a step (22) for supporting said extensions (81, 82) when said lifting means (1) is pulled or pushed, and
  - a step (23) for preventing said first spring (8) from coming out of its position during operation.

10. The seat lifting assembly as claimed in claim 1, wherein said link (17) is formed out of a rectangular shape and comprises:
- a first hole (171) at one end of said rectangular link through which an end (142) of the cam shaft (14) passes,
- a second hole (175) at other end of said rectangular link,
- a third hole (173) and a fourth hole (174) surrounding said first hole (171) to engage with embosses (163, 164) of said fourth gear (16) for holding the fourth gear (16), and
- an emboss (172) near said third hole (173) towards an other end of said link (17) for controlling the movement of the link (17).

* * * * *